United States Patent
Matczynski et al.

(10) Patent No.: US 10,291,475 B2
(45) Date of Patent: May 14, 2019

(54) VIRTUALIZATION OF MANAGEMENT SERVICES IN A CLOUD COMPUTING ENVIRONMENT

(71) Applicant: Verizon Patent and Licensing Inc., Basking Ridge, NJ (US)

(72) Inventors: Michael J. Matczynski, Waltham, MA (US); Paul M. Curtis, Sudbury, MA (US); Owen F. Kellett, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 649 days.

(21) Appl. No.: 13/959,175

(22) Filed: Aug. 5, 2013

(65) Prior Publication Data

US 2015/0039768 A1    Feb. 5, 2015

(51) Int. Cl.
*H04L 12/24*    (2006.01)
*G06F 9/50*    (2006.01)
(Continued)

(52) U.S. Cl.
CPC ........ *H04L 41/0896* (2013.01); *G06F 9/5072* (2013.01); *H04L 47/781* (2013.01);
(Continued)

(58) Field of Classification Search
CPC ............. H04L 41/0896; H04L 41/5096; H04L 47/781; H04L 47/805; H04L 67/10; G06F 9/5072
(Continued)

(56) References Cited

U.S. PATENT DOCUMENTS 8,417,938 B1 * 4/2013 Considine ............. G06F 9/5088
713/151
8,650,299 B1 * 2/2014 Huang ................ H04L 67/1002
709/226
(Continued)

OTHER PUBLICATIONS

Buyya, Rajkumar, Chee Shin Yeo, and Srikumar Venugopal. "Market-oriented cloud computing: Vision, hype, and reality for delivering it services as computing utilities." in High Performance Computing and Communications, 2008. HPCC'08. 10th IEEE International Conference on, pp. 5-13. Ieee, 2008.*

*Primary Examiner* — Cheikh T Ndiaye
*Assistant Examiner* — Melaku Y Habtemariam

(57) ABSTRACT

A device designates a first set of computing resources, of a cloud computing environment, for management services. The management services include services that manage the cloud computing environment, and the first set of computing resources provides a particular quality of service for the management services. The device provisions the first set of computing resources with the management services, and designates a second set of computing resources for user services. The second set of computing resources is separate from the first set of computing resources, and the user services include services provided to users of the cloud computing environment. The device provisions the second set of computing resources with the user services, and designates a third set of computing resources for a pool of unused computing resources. The third set of computing resources is separate from the first set of computing resources and the second set of computing resources.

20 Claims, 14 Drawing Sheets

(51) Int. Cl.
  *H04L 12/911* (2013.01)
  *H04L 12/927* (2013.01)
  *H04L 29/08* (2006.01)

(52) U.S. Cl.
  CPC ........ *H04L 47/805* (2013.01); *H04L 41/5096* (2013.01); *H04L 67/10* (2013.01)

(58) Field of Classification Search
  USPC .................. 709/217–219, 224–227, 232
  See application file for complete search history.

(56) References Cited

U.S. PATENT DOCUMENTS

| | | | | |
|---|---|---|---|---|
| 2004/0047354 A1* | 3/2004 | Slater | ................. | H04L 41/0896 370/400 |
| 2005/0169179 A1* | 8/2005 | Antal | ................. | H04L 41/0806 370/231 |
| 2011/0016214 A1* | 1/2011 | Jackson | ................ | G06F 9/5044 709/224 |
| 2011/0131335 A1* | 6/2011 | Spaltro | ................ | G06F 9/5072 709/228 |
| 2011/0213884 A1* | 9/2011 | Ferris | ................. | G06F 9/50 709/226 |
| 2011/0320606 A1* | 12/2011 | Madduri | ............... | G06F 9/5005 709/226 |
| 2012/0144041 A1* | 6/2012 | Lee | ..................... | H04W 4/003 709/226 |
| 2012/0226788 A1* | 9/2012 | Jackson | ................ | G06F 9/505 709/223 |
| 2012/0271927 A1* | 10/2012 | Shakirzyanov | ....... | G06F 9/5061 709/220 |
| 2012/0271944 A1* | 10/2012 | Turner | .................. | G06F 9/5072 709/224 |
| 2013/0132553 A1* | 5/2013 | Stratton | ................. | H04L 41/50 709/223 |
| 2013/0138798 A1* | 5/2013 | Gohad | ................... | H04L 43/08 709/224 |
| 2013/0185729 A1* | 7/2013 | Vasic | .................... | G06F 9/5072 718/104 |
| 2013/0191436 A1* | 7/2013 | Chintalapati | ......... | G06F 9/5072 709/201 |
| 2013/0247034 A1* | 9/2013 | Messerli | ............. | G06F 9/45533 718/1 |
| 2014/0019617 A1* | 1/2014 | Hadar | ................ | G06F 9/45558 709/225 |
| 2014/0026231 A1* | 1/2014 | Barak | ................ | G06F 9/45558 726/29 |
| 2014/0059179 A1* | 2/2014 | Lam | ............... | H04N 21/234363 709/219 |

* cited by examiner

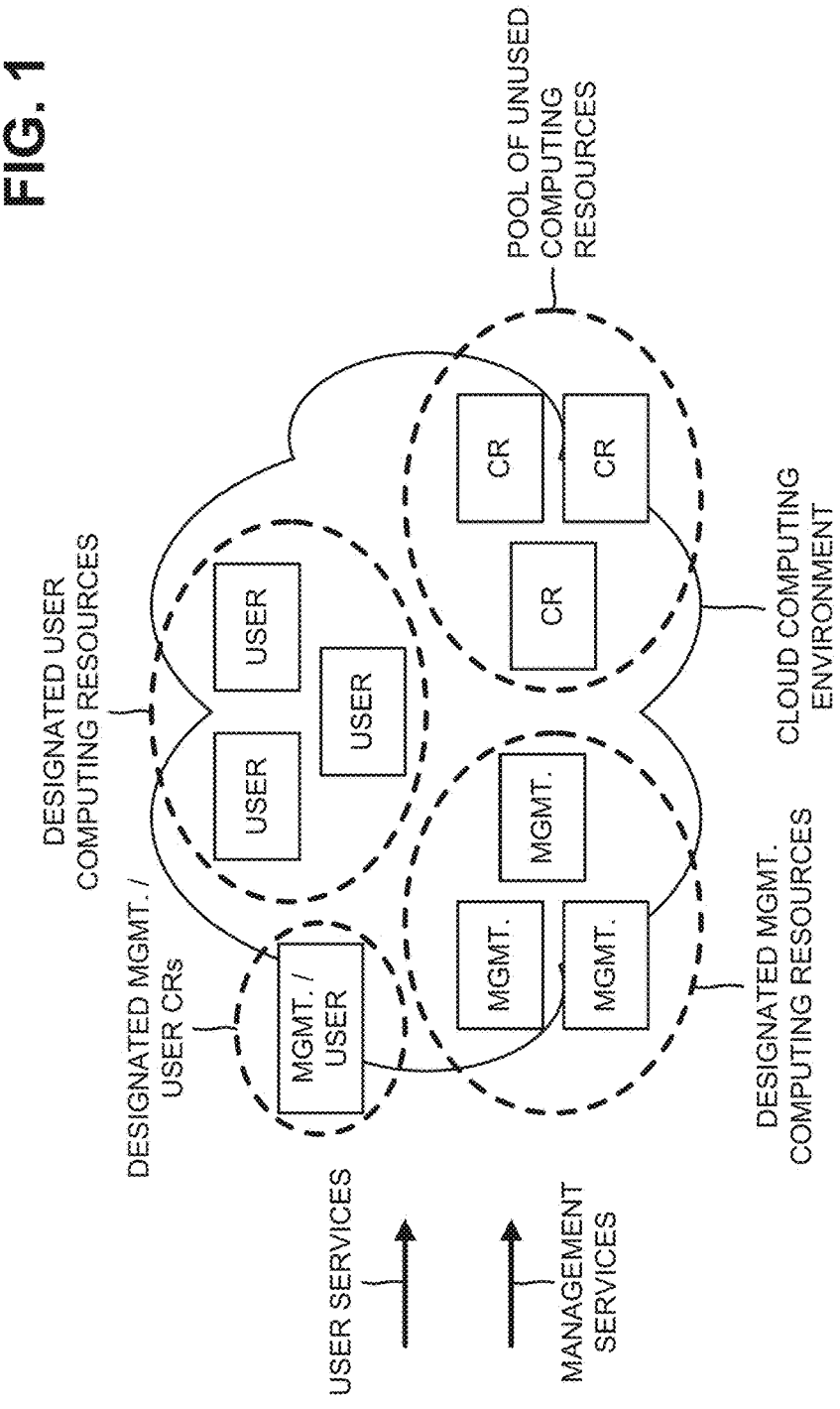

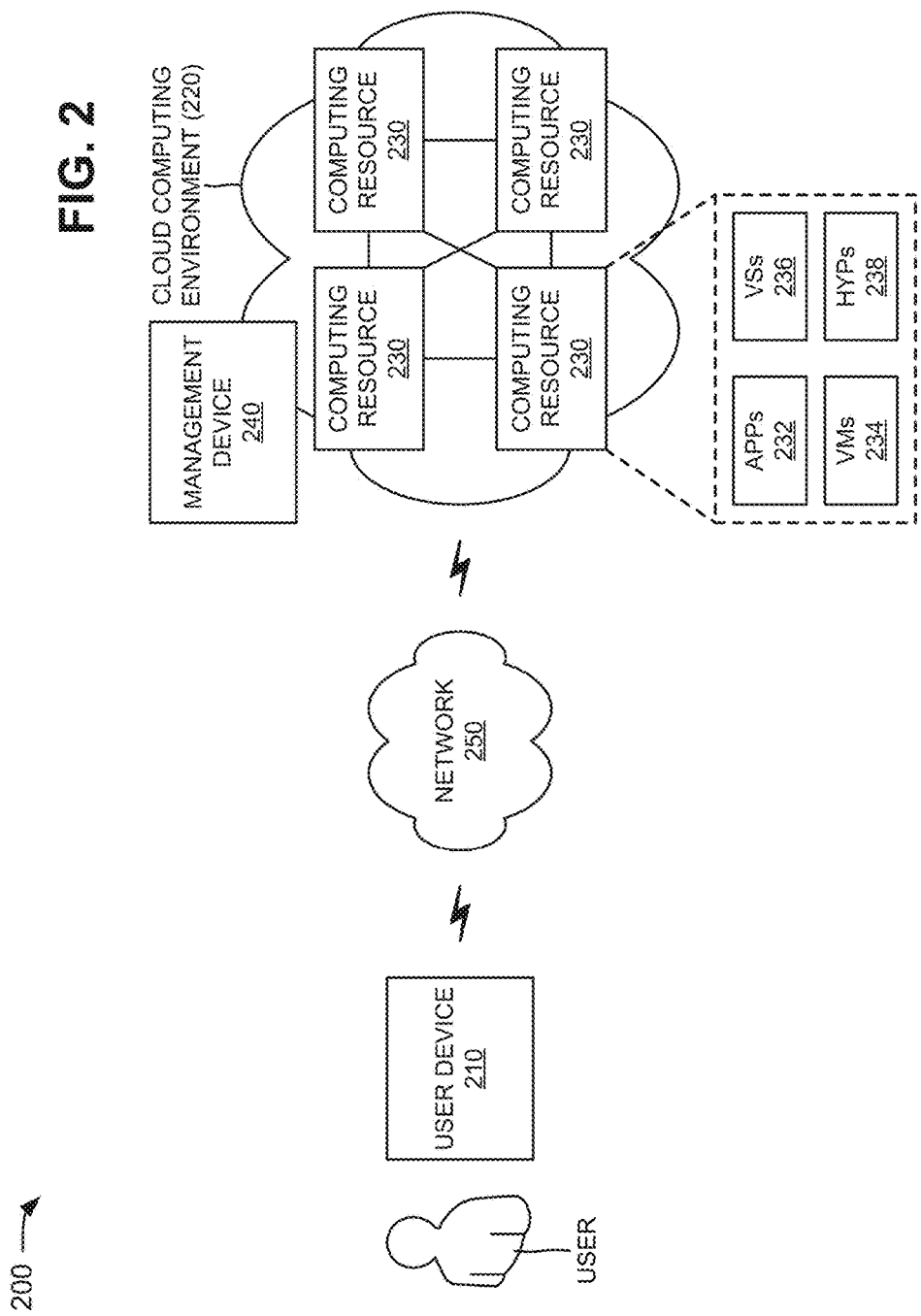

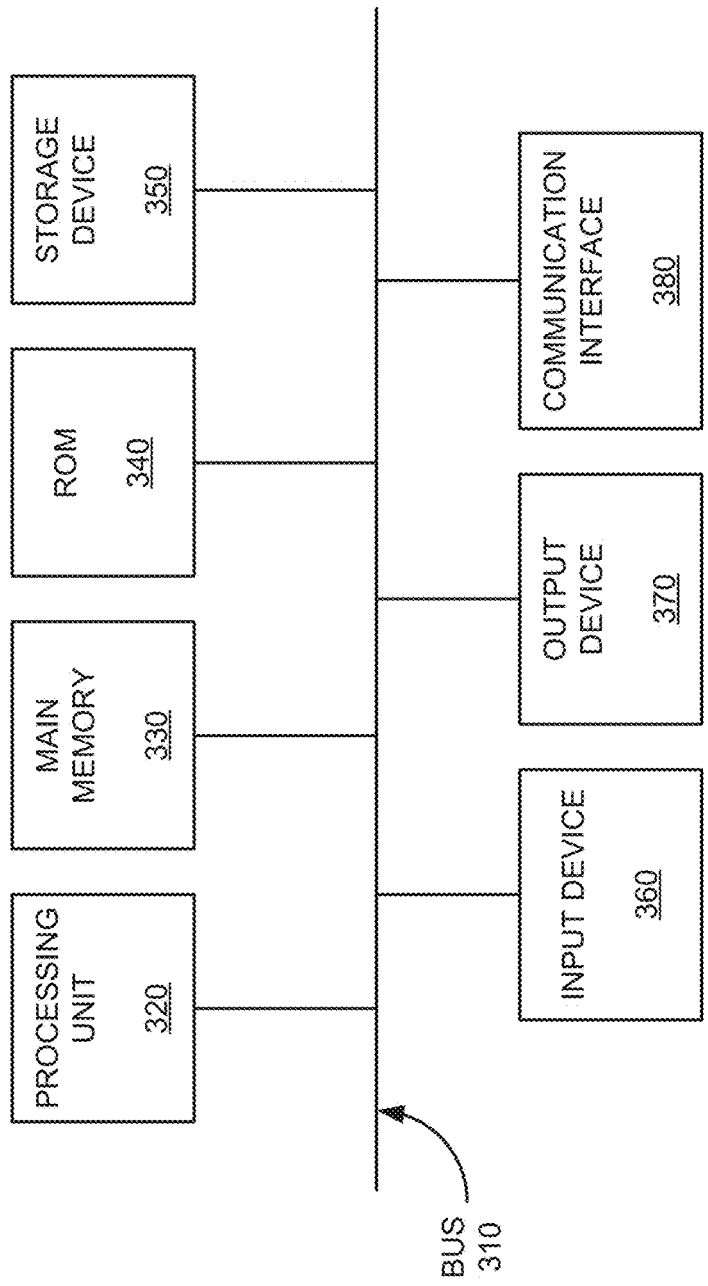

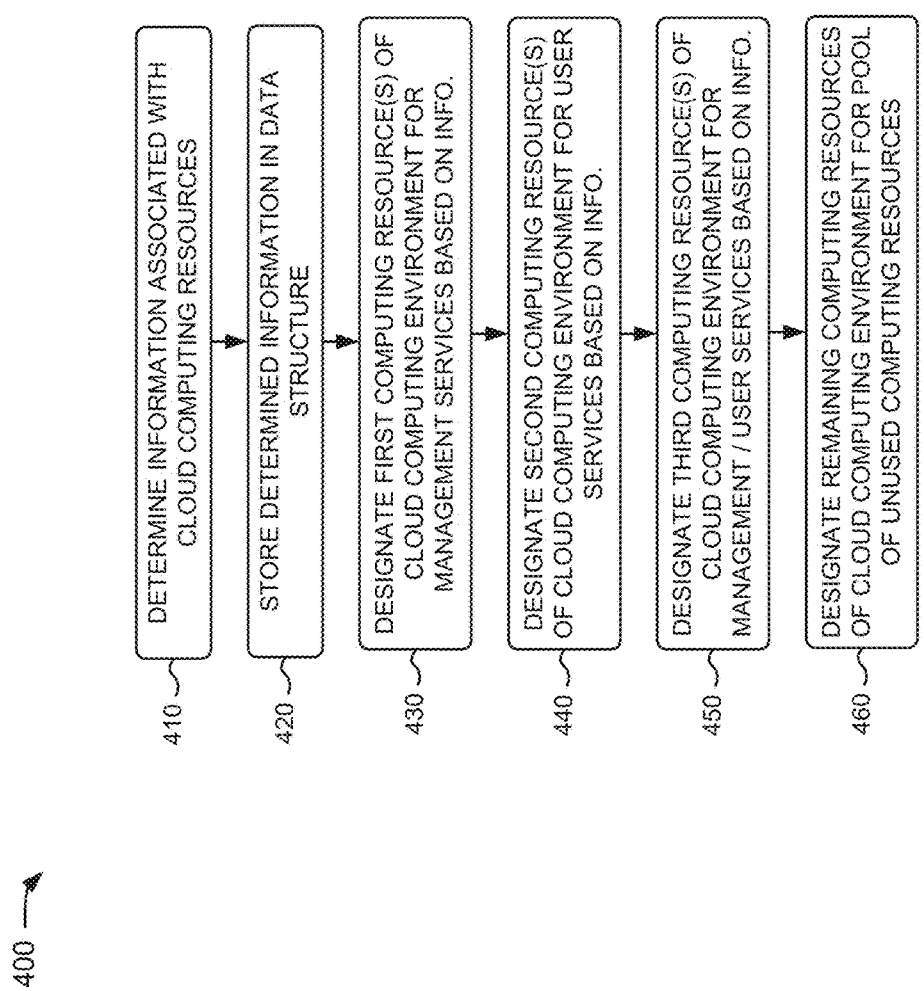

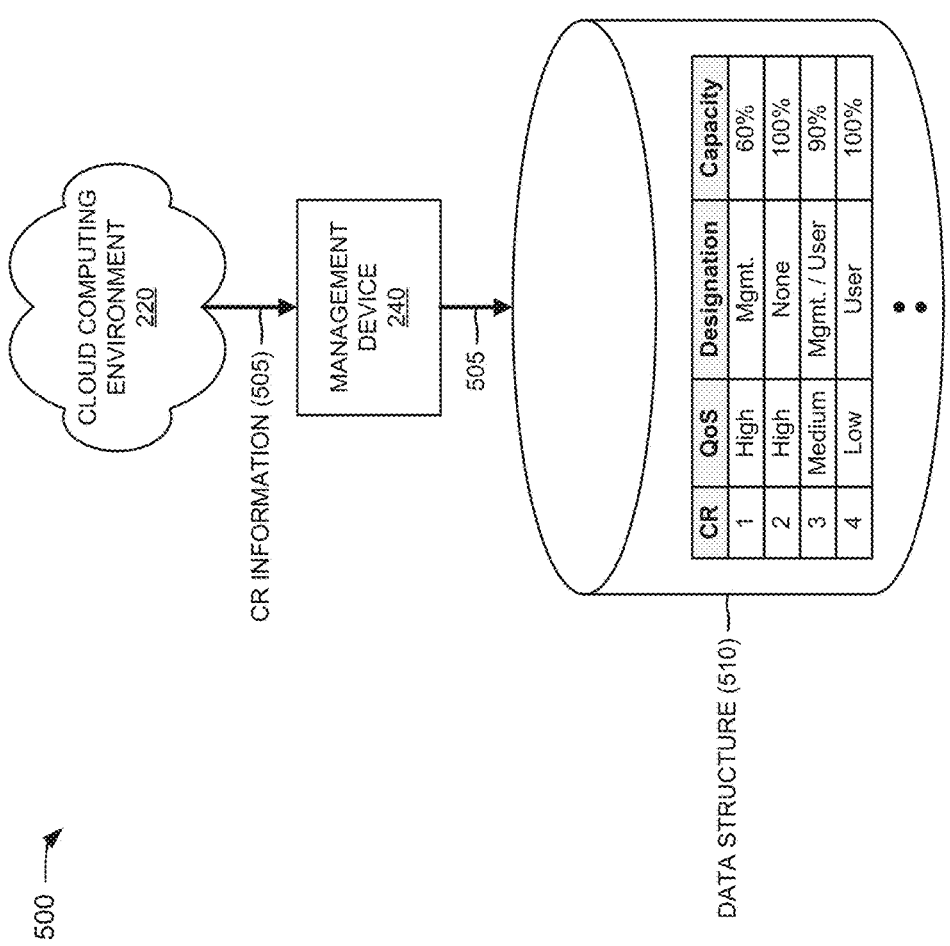

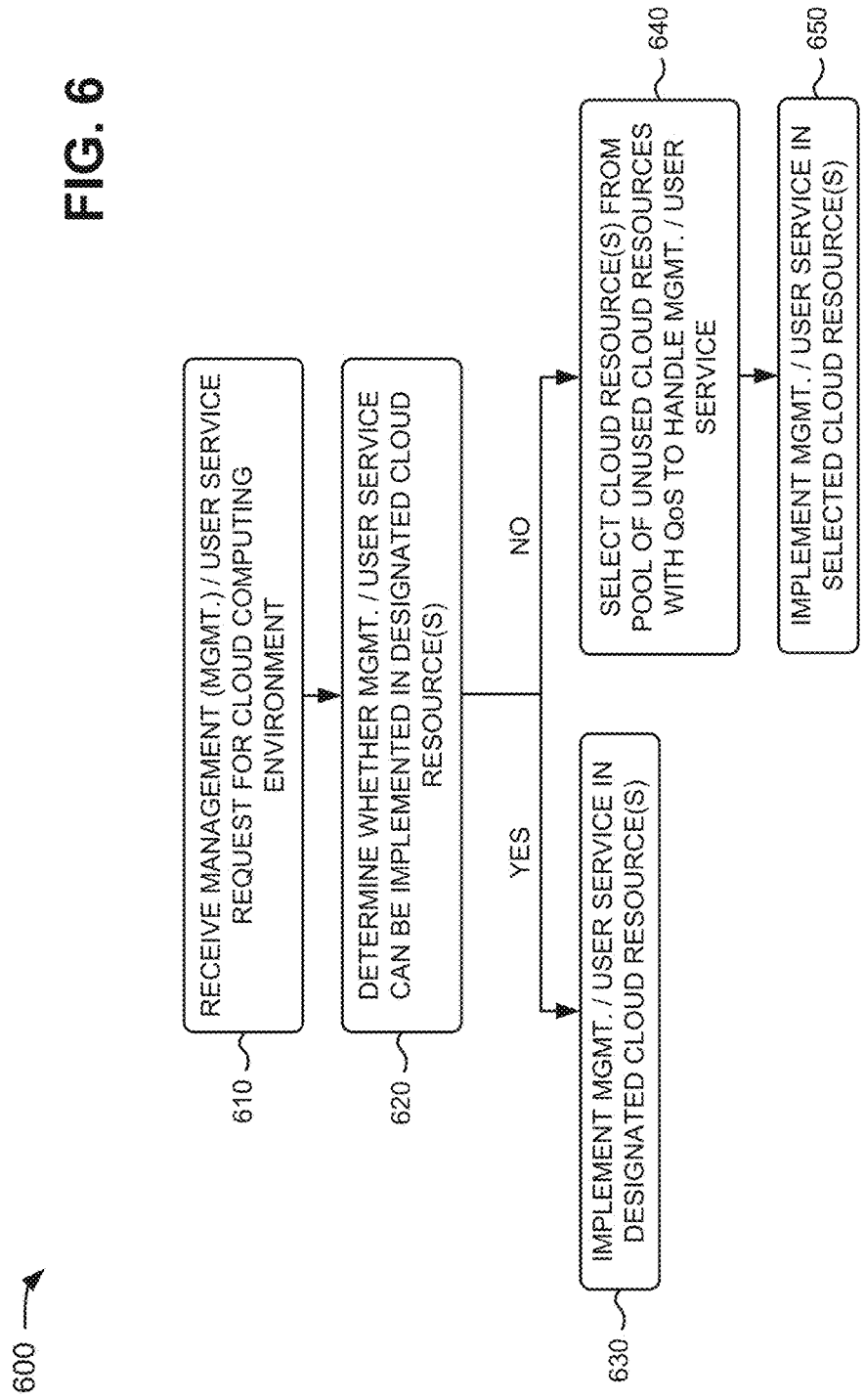

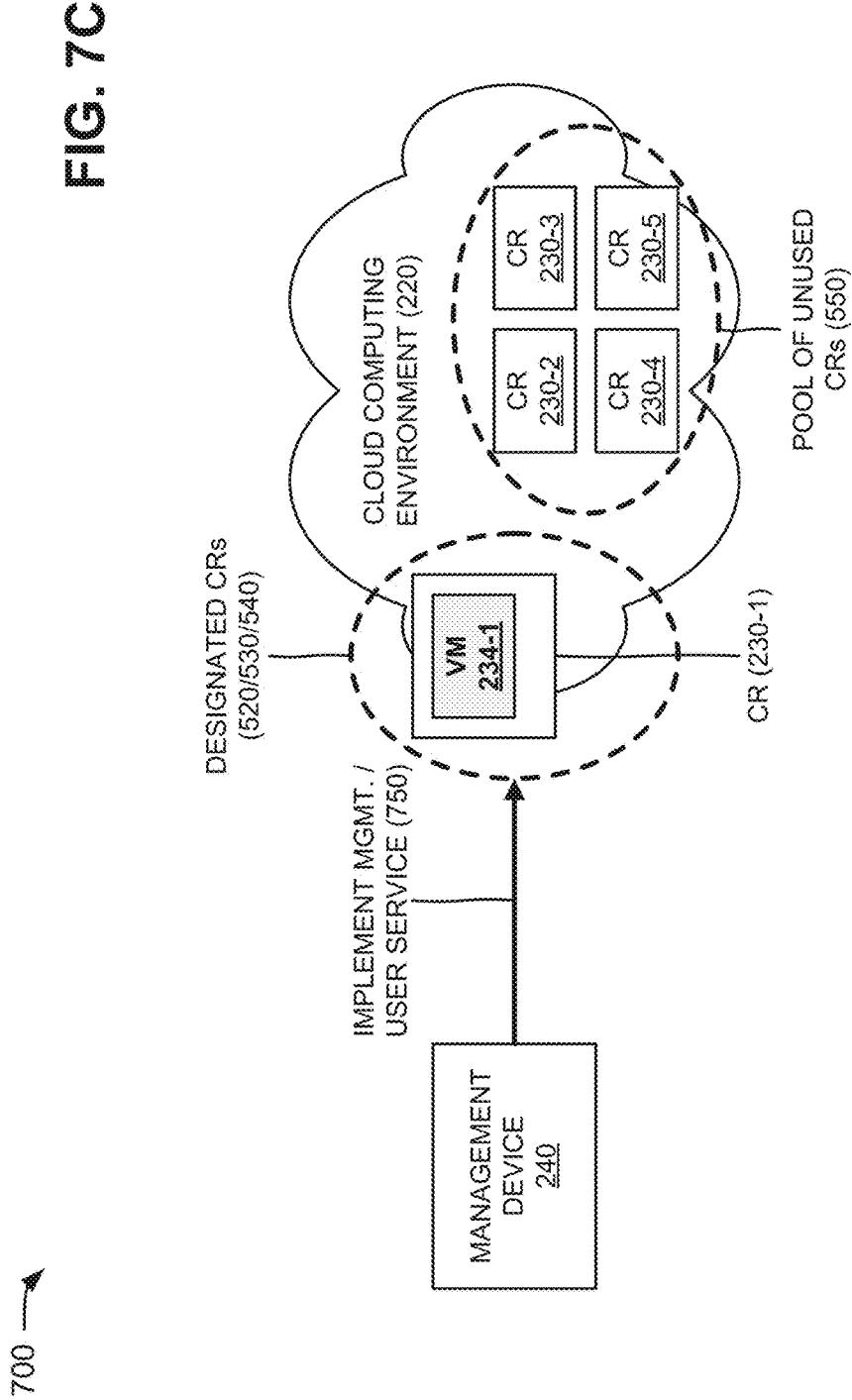

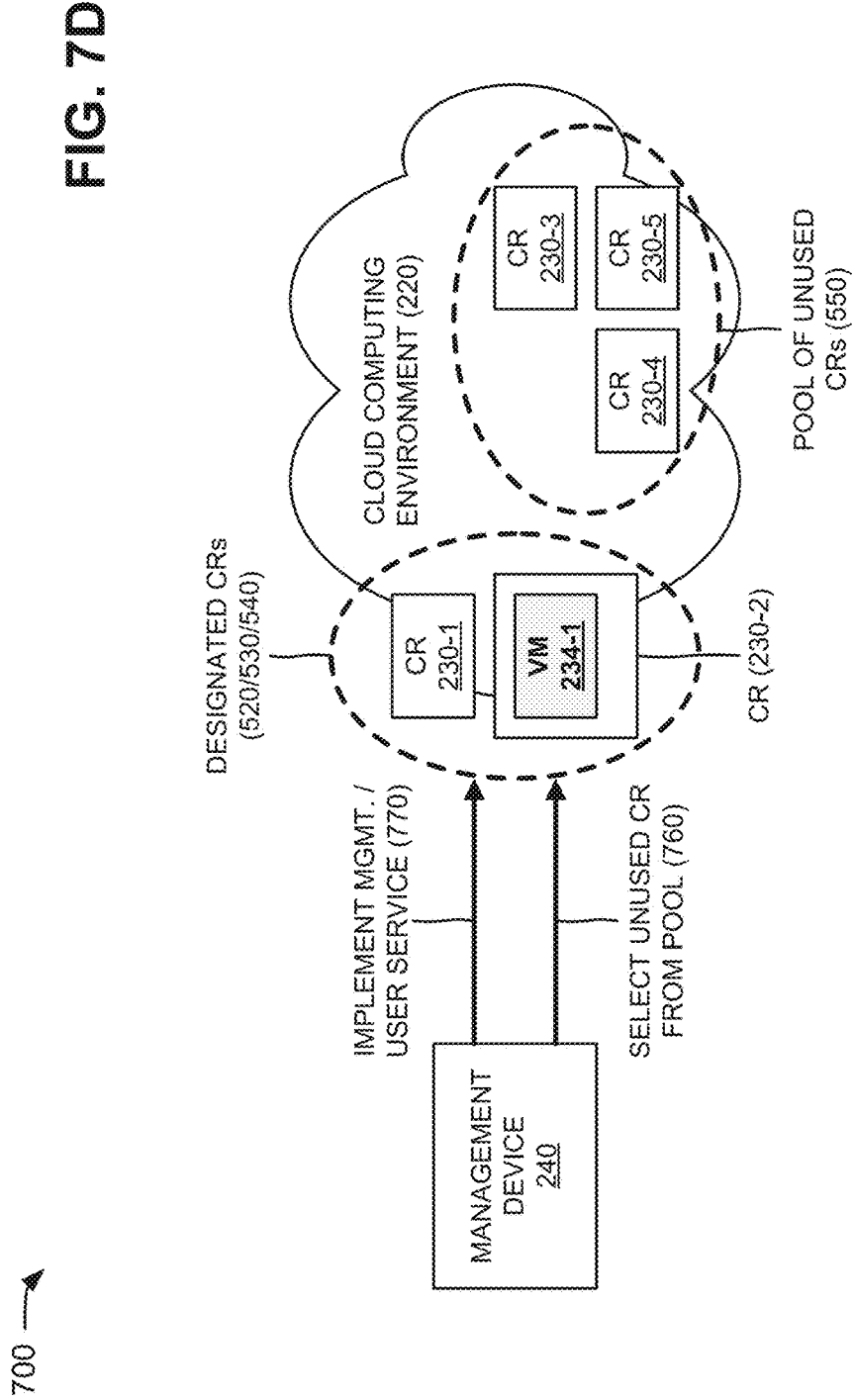

VIRTUALIZATION OF MANAGEMENT SERVICES IN A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. A user may create one or more VMs in the cloud computing environment. The user may also delete one or more VMs in the cloud computing environment.

A cloud computing environment may include a first set of computing resources (e.g., storage devices, servers, switches, hypervisors, etc.) that provide services for managing the cloud computing environment. Computing resources providing such management services may be referred to as management plane resources. The cloud computing environment may include a second set of computing resources, separate from the first set of computing resources, which provide user services (e.g., providing virtualized storage, executing VMs, etc.) for the cloud computing environment. Computing resources providing such user services may be referred to as user plane resources. The management plane resources may require a higher quality of service (QoS) (e.g., a bit rate, a delay, jitter, a packet dropping probability, a bit error rate, etc.) than the user plane resources since the management services may need to be safeguarded more than the user services. Such an arrangement may be inefficient since computing resources may be added to the management plane resources even when computing resources are available in the user plane resources.

BRIEF DESCRIPTION OF THE DRAWINGS

FIG. 1 is a diagram of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for designating computing resources of a cloud computing environment and storing information associated with the computing resources;

FIGS. 5A-5E are diagrams of an example of the process described in connection with FIG. 4;

FIG. 6 is a flow chart of an example process for implementing a management service or a user service in a computing resource associated with a cloud computing environment; and FIGS. 7A-7D are diagrams of an example of the process described in connection with FIG. 6.

DETAILED DESCRIPTION OF PREFERRED EMBODIMENTS

Figure 5B:
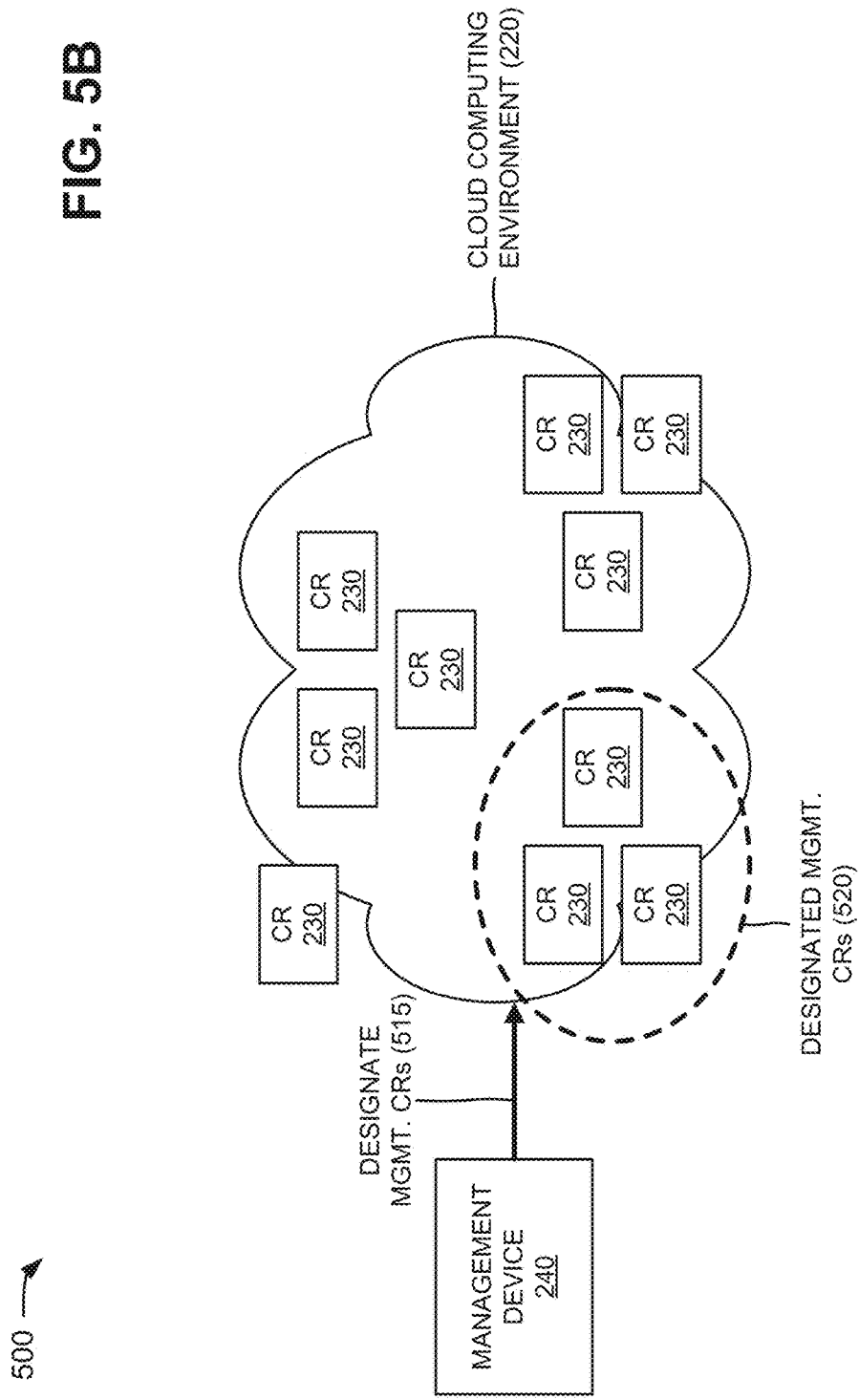
Figure 5C:
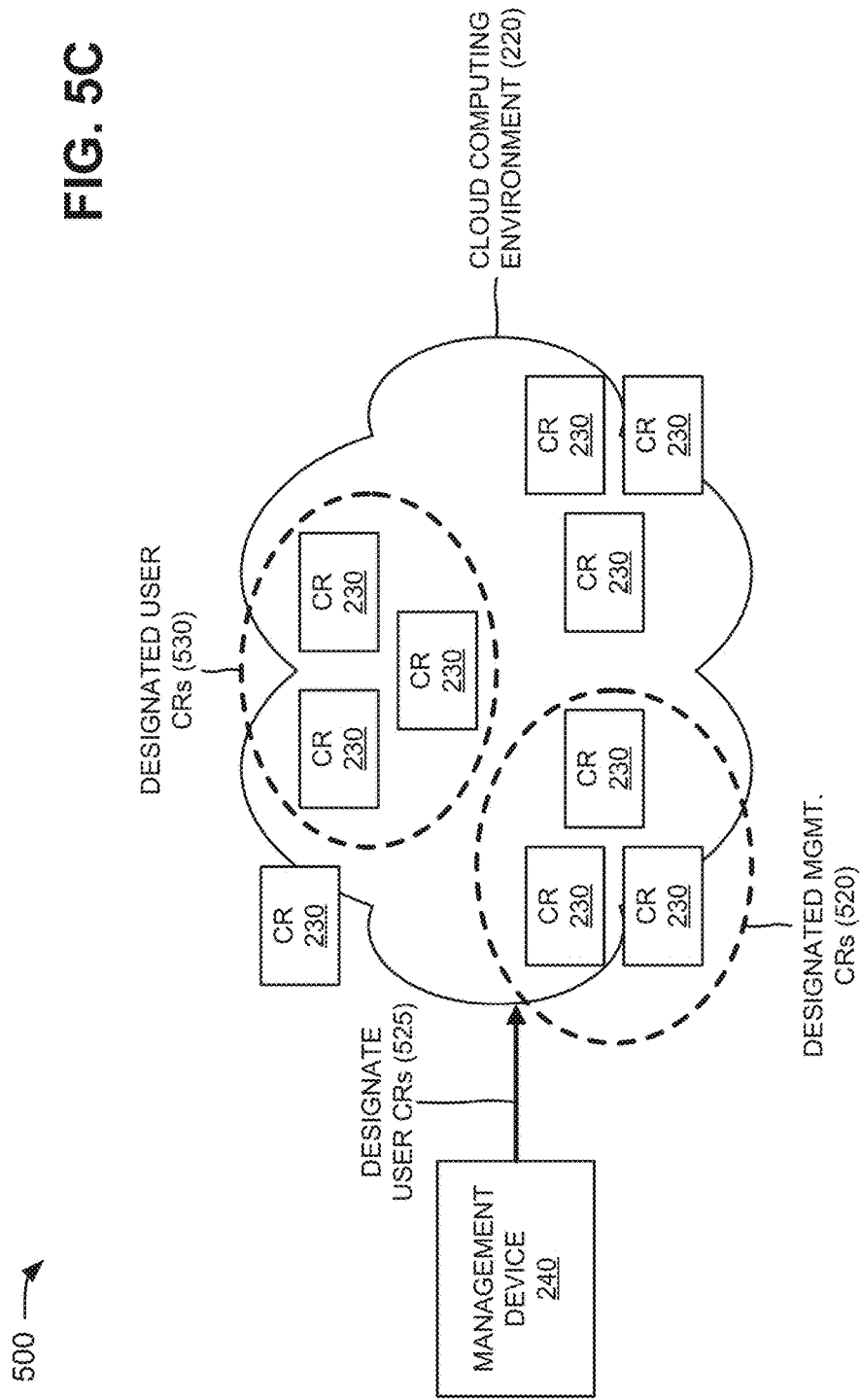

The following detailed description refers to the accompanying drawings. The same reference numbers in different drawings may identify the same or similar elements.

Systems and/or methods described herein may provide a single set or pool of computing resources (e.g., instead of two separate sets of computing resources) that may be used in a cloud computing environment as management plane resources and/or user plane resources. This may enable the cloud computing environment to add management services and/or user services via the same pool of computing resources. For example, management services may be provided by computing resources that formerly provided user services, and user services may be provided by computing resources that formerly provided management services. Computing resources may be added to or removed from the pool of computing resources, from computing resources dedicated to management services, and/or from computing resources dedicated to user services.

FIG. 1 is a diagram of an overview of example implementations described herein. For the overview, assume that a cloud computing environment includes a pool of unused computing resources. The computing resources may include one or more personal computers, workstation computers, server devices, storage devices, or other types of computation and communication devices. In some implementations, some or all of the computing resources may include QoS capabilities that enable the computing resources to be used for management services and/or user services. The management services may include services used to manage the cloud computing environment, such as console server services, proxy server services, virtual private network (VPN) services, data center persistence services, etc. The user services may include services provided to users of the cloud computing environment, such as virtualized storage, software applications, etc.

As further shown in FIG. 1, one or more computing resources may be designated as management (MGMT.) computing resources that may be used to provide management services for the cloud computing environment. One or more computing resources may be designated as user computing resources that may be used to provide user services for the cloud computing environment. In some implementations, one or more computing resources may be designated to provide management services and user services for the cloud computing environment. The remaining computing resources may be allocated to a pool of unused computing resources.

When a request for a new management service or user service is received, the cloud computing environment may determine whether the new management service or user service can be provided by the designated computing resource(s). If the new management service or user service can be provided by the designated computing resource(s), the cloud computing environment may provision the designated computing resource(s) with the new management service or user service. If the new management service or user service cannot be provided by the designated computing resource(s), the cloud computing environment may select one or more unused computing resources, and may provision the selected unused computing resource(s) with the new management service or user service.

Such an arrangement may make upgrading a cloud computing environment with management services more flexible and more scalable. The arrangement may also make planning of management services for the cloud computing environment easier. The arrangement may enable the computing resources of the cloud computing environment to be used more efficiently since the management services and the user services may be implemented in the same computing resources.

FIG. 2 is a diagram of an example environment 200 in which systems and/or methods described herein may be implemented. As illustrated, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant (PDA), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230) and a management device 240. Computing resource 230 may include one or more personal computers, workstation computers, server devices, storage devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage the infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Management device 240 may include one or more computing resources 230 or one or more computation and communication devices separated from computing resources 230. In some implementations, management device 240 may assign (e.g., via interaction with a system administrator) management services and/or user services to cloud computing environment 220.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. Each of the devices of environment 200 may include one or more devices 300 and/or one or more components of device 300. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive, or a removable memory, such as a flash drive.

Input device 360 may include a component that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a component that outputs information to the user, including a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for designating computing resources of a cloud computing environment and storing information associated with the computing resources. In some implementations, process 400 may be performed by management device 240. In some implementations, process 400 may be performed by another device or a group of devices separate from or including management device 240.

As further shown in FIG. 4, process 400 may include determining information associated with computing resources of a cloud computing environment (block 410). For example, management device 510 may determine information associated with computing resources 230 of cloud computing environment 220. In some implementations, the determined information may include identifiers associated with computing resources 230, QoS associated with computing resources 230, available capacities associated with computing resources 230, etc. In some implementations, management device 510 may generate some information (e.g., the designations) and may associate the generated information with the determined information. For example, assume that a first computing resource 230-1 provides a VPN service (e.g., a management service), has particular QoS capabilities, and has 50% available capacity. Management device 510 may determine an identifier (e.g., CR1), QoS information (e.g., high), and available capacity information (e.g., 50%) from the first computing resource 230-1, and may generate a designation (e.g., management) for the first computing resource 230-1.

As further shown in FIG. 4, process 400 may include storing the information associated with the computing resources in a data structure (block 420). For example, management device 510 may store the information associated with computing resources 230 in a data structure associated with management device 510. The data structure may include a database, a table, a list, an array, etc. In some implementations, the data structure may store the information as a table with a computing resource identifier field, a QoS field, a designation field, a capacity field, and a variety of entries associated with the fields. For example, for the information associated with the first computing resource 230-1, the data structure may store the identifier (e.g., CR1) in the computing resource identifier field, the QoS information (e.g., high) in the QoS field, the designation (e.g., management) in the designation field, and the available capacity information (e.g., 50%) in the capacity field.

As shown in FIG. 4, process 400 may include designating first computing resource(s) of a cloud computing environment for management services based on the information associated with the cloud computing resources (block 430). For example, all of computing resources 230 may include QoS capabilities (e.g., particular bit rates, particular delays, particular jitter, particular packet dropping probabilities, particular bit error rates, etc.) that enable computing resources 230 to provide management services and user services for cloud computing environment 220. The QoS capabilities may provide safeguards for the management services (e.g., from denial of service (DoS) attacks and/or other malicious activity) and may guarantee that the management services are available to cloud computing environment 220. In some implementations, the QoS capabilities may include the provision of traffic regulation, traffic shaping, flow throttling, etc. to achieve a required QoS (e.g., a required load, bandwidth, burstiness, delay, security, etc.) and to provide safeguards for the management services. The user services may not require such safeguards and/or guarantees, but the QoS capabilities may provide such safeguards and/or guarantees to the user services provided by cloud computing environment 220.

In some implementations, some of computing resources 230 of cloud computing environment 220 may include the QoS capabilities that provide the safeguards and/or guarantees for the management services. The remaining computing resources 230 of cloud computing environment 220 may not include the QoS capabilities that provide the safeguards and/or guarantees, but still may support the user services of cloud computing environment 220. The management services may include services used to manage cloud computing environment 220, such as, for example, console server services, proxy server services, VPN services, data center persistence services, security services, etc. The user services may include services provided to users of cloud computing environment 220, such as, for example, software application services (e.g., content services, communication services, etc.), platform services (e.g., storage services, database services, identity services, etc.), infrastructure services (e.g., networking services, compute services, etc.), etc.

In some implementations, management device 240 may designate a first set of one or more computing resources 230 for providing the management services of cloud computing environment 220 based on the information stored in the data structure. For example, management device 240 may select the first set of computing resources 230 based on capabilities (e.g., storage, processing power, QoS, etc.) associated with computing resources 230 and utilizing random selection, round robin selection, or other selection techniques. Management device 240 may provision the management services in the first set of computing resource(s) 230. For example, management device 510 may instruct the first set of computing resource(s) 230 to create one or more applications 232, virtual machines 234, virtualized storage 236, hypervisors 238, etc. that are configured to provide the management services.

As further shown in FIG. 4, process 400 may include designating second computing resource(s) of the cloud computing environment for user services based on the information associated with the cloud computing resources (block 440). For example, management device 510 may designate a second set of one or more computing resources 230 for providing the user services of cloud computing environment 220 based on the information stored in the data structure. In some implementations, the second set of computing resource(s) 230 may be separate from the first set of computing resource(s) 230. For example, management device 240 may select the second set of computing resources 230 based on capabilities associated with computing resources 230 and utilizing random selection, round robin selection, or other selection techniques. Management device 510 may provision the user services in the second set of computing resource(s) 230. For example, management device 510 may instruct the second set of computing resource(s) 230 to create one or more applications 232, virtual machines 234, virtualized storage 236, hypervisors 238, etc. that are configured to provide the user services.

As still further shown in FIG. 4, process 400 may include designating third computing resource(s) of the cloud computing environment for management services and user services based on the information associated with the cloud computing resources (block 450). For example, management device 510 may designate a third set of one or more computing resources 230 for providing some of the management services and some of the user services of cloud computing environment 220 based on the information stored in the data structure. In some implementations, the third set of computing resource(s) 230 may be separate from the first set of computing resource(s) 230 and the second set of computing resource(s) 230. For example, management device 240 may select the third set of computing resources 230 based on capabilities associated with computing resources 230 and utilizing random selection, round robin selection, or other selection techniques. Management device 510 may provision the management services and the user services in the third set of computing resource(s) 230. For example, management device 510 may instruct the third set of computing resource(s) 230 to create one or more applications 232, virtual machines 234, virtualized storage 236, hypervisors 238, etc. that may provide the management services, and one or more other applications 232, virtual machines 234, virtualized storage 236, hypervisors 238, etc. that are configured to provide the user services.

As further shown in FIG. 4, process 400 may include designating the remaining computing resource(s) of the cloud computing environment for a pool of unused computing resources (block 460). For example, management device 510 may designate remaining computing resources 230 of cloud computing environment 220, not designated for the first set, the second set, or the third set of computing resource(s) 230, for a pool of unused computing resources 230. In some implementations, all of computing resources 230 may initially be provided in the pool of unused computing resources 230 until computing resources are provisioned for management services and/or user services. In some implementations, one or more computing resources 230 provisioned for management services and/or user services may be returned to the pool of unused computing resources 230 when the computing resource(s) 230 are no longer required to provide the management services and/or the user services.

For example, assume that a particular computing resource 230 is provisioned for providing a security service (e.g., a management service), and that a system administrator wishes to remove the security service since the service is obsolete. The system administrator may utilize management device 510 to instruct the particular computing resource 230 to remove the security service and to return the particular computing resource 230 to the pool of unused computing resources 230. In another example, assume that another computing resource 230 is designated for providing a software application (e.g., a user service), and that a user of user device 210 wishes to remove the software application since the software application is not being utilized by the user. The user may utilize user device 210 and management device 510 to instruct the other computing resource 230 to remove the software application and to return the other computing resource 230 to the pool of unused computing resources 230.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Further, one or more blocks may be omitted in some implementations.

FIGS. 5A-5E are diagrams of an example 500 of the process described above with respect to FIG. 4. In example 500, assume that management device 240 determines information 505 associated with computing resources 230 of cloud computing environment 220, as shown in FIG. 5A. Information 505 may include identifiers associated with computing resources 230, QoS associated with computing resources 230, designations associated with computing resources 230, available capacities associated with computing resources 230, bandwidth associated with computing resources 230, processor speeds associated with computing resources, etc. For example, assume that a third computing resource 230-3 provides a proxy service (e.g., a management service) and a software application (e.g., a user service), has medium QoS capabilities, and has 90% available capacity. Management device 240 may determine, via information 505, an identifier (e.g., 3), QoS information (e.g., medium), and available capacity information (e.g., 90%) from the third computing resource 230-3, and may generate a designation (e.g., management/user) for the third computing resource 230-3.

As further shown in FIG. 5A, management device 240 may store information 505 in a data structure 510. In example 500, data structure 510 may store information 505 as a table with a computing resource (CR) identifier field, a QoS field, a designation field, a capacity field, and a variety of entries associated with the fields. For example, for the third computing resource 230-3, data structure 510 may store the identifier (e.g., 3) in the computing resource identifier field, the QoS information (e.g., medium) in the QoS field, the designation (e.g., management/user) in the designation field, and the available capacity information (e.g., 90%) in the capacity field. Data structure 510 may store similar information for other computing resources 230 of cloud computing environment 220.

In example 500, assume that cloud computing environment 220 initially includes ten unused computing resources 230, as shown in FIG. 5B. A system administrator associated with management device 240 may wish to designate some of computing resources 230 for providing management services. For example, the system administrator may utilize management device 240 to designate three computing resources 230 for providing management services, as indicated by reference number 515. The designated computing resources 230 will be referred to as designated management computing resources 520. Management device 240 may select the designated management computing resources 520 based on capabilities associated with the designated management computing resources 520 and utilizing random selection, round robin selection, or other selection techniques. Management device 240 may provision the management services in designated management computing resources 520. For example, assume that management device 240 provides a security service in a first computing resource 230 of designated management computing resources 520, a proxy server service in a second computing resource 230, and a VPN service in a third computing resource 230.

Further assume that the system administrator, or a user associated with user device 210, wishes to designate some of computing resources 230 for providing user services. For example, the system administrator or the user (e.g., via user device 210) may utilize management device 240 to designate three computing resources 230 for providing user services, as indicated by reference number 525 in FIG. 5C. The designated computing resources 230 will be referred to as designated user computing resources 530. Management device 240 may select the designated user computing resources 530 based on capabilities associated with the designated user computing resources 530 and utilizing random selection, round robin selection, or other selection techniques. Management device 240 may provision the user services in designated user computing resources 530. For example, assume that management device 240 provides a content service in a first computing resource 230 of designated user computing resources 530, a storage service in a second computing resource 230 of designated user computing resources 530, and a networking service in a third computing resource 230 of designated user computing resources 530.

In example 500, the system administrator or the user may wish to designate some of computing resources 230 for providing management services and user services. For example, assume that the system administrator or the user (e.g., via user device 210) utilizes management device 240 to designate one computing resource 230 for providing management services and user services, as indicated by reference number 535 in FIG. 5D. The designated computing resource 230 will be referred to as designated management/user computing resources 540. Management device 240 may select the designated management/user computing resources 540 based on capabilities associated with the designated management/user computing resources 540 and utilizing random selection, round robin selection, or other selection techniques. Management device 240 may provision the management services and the user services in designated management/user computing resources 540. For example, management device 240 may provide a proxy server service (e.g., a management service) and a database service (e.g., a user service) in computing resource 230 of designated management/user computing resources 540.

Figure 5D:
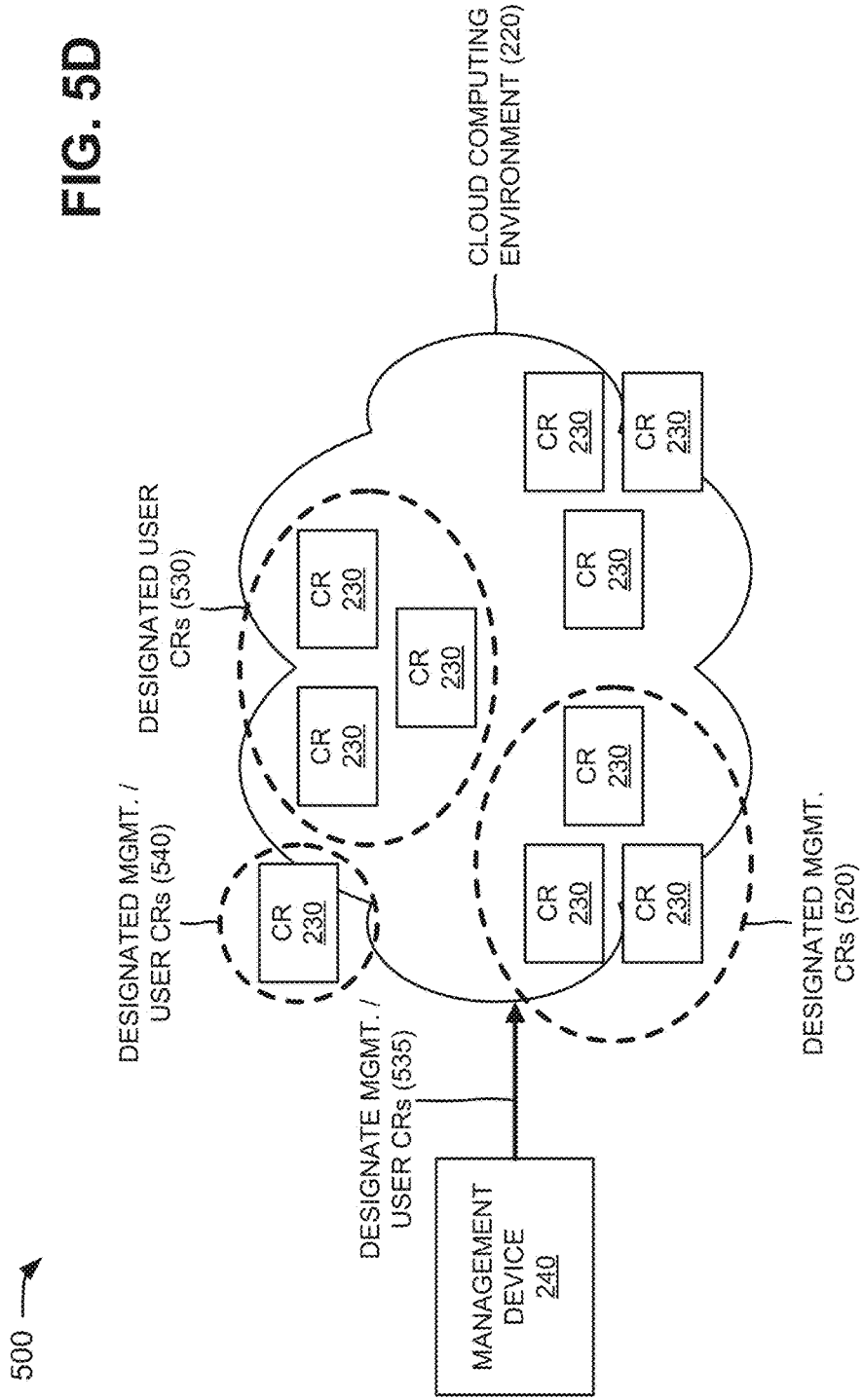
Figure 5E:
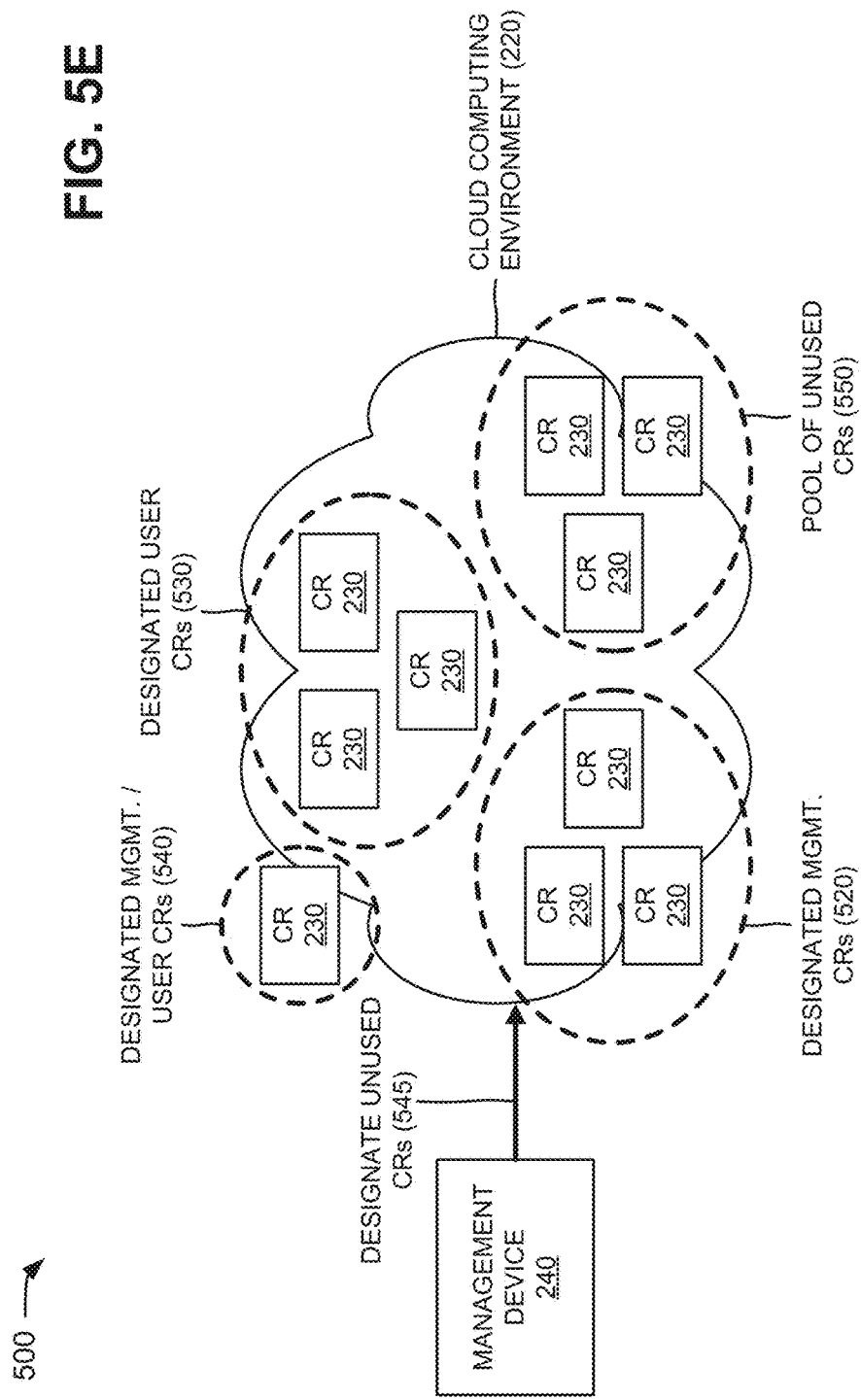

In example 500, management device 240 may designate the three remaining computing resources 230 as unused computing resources, as indicated by reference number 545 in FIG. 5D. The designated unused computing resources 230 will be referred to as a pool of unused computing resources 550. In some implementations, any of the designated unused computing resources 230 may be utilized to provide management services and/or user services on an as-needed basis since the unused computing resources 230 may include QoS capabilities that provide management services. For example, the system administrator may wish to provide a new user authentication service to cloud computing environment 220, and the designated management computing resources 230 may not be able to provide the new user authentication service. In such a situation, management device 240 may select and provision one or more of the designated unused computing resources 230 to provide the new user authentication service.

FIG. 6 is a flow chart of an example process 600 for implementing a management service or a user service in a computing resource associated with a cloud computing environment. In some implementations, process 600 may be performed by management device 240. In some implementations, process 600 may be performed by another device or a group of devices separate from or including management device 240.

As shown in FIG. 6, process 600 may include receiving a management service or user service request for a cloud computing environment (block 610). For example, management device 240 may receive a management service request from the system administrator associated with management device 240. In some implementations, management device 240 may generate the management service request when management device 240 determines that the management service is required for cloud computing environment 220. For example, if management device 240 determines that additional security is needed for cloud computing environment 220, management device 240 may generate a request for a new security service for cloud computing environment 220. In some implementations, the management service may include a service used to manage cloud computing environment 220, such as a console server service, a proxy server service, a VPN service, a data center persistence service, a security service, an authentication service, etc.

In some implementations, management device 240 may receive a user service request from user device 210, associated with the user, or from the system administrator. For example, if the user wishes to utilize virtualized storage 236, the user may utilize user device 210 to provide a request for virtualized storage 236 to management device 240. If the system administrator wishes to provide a new software application, the system administrator may provide a request for the new software application to management device 240. In some implementations, the user service may include a service provided to users of cloud computing environment 220, such as, for example, a software application service, a platform service, an infrastructure service, etc.

As further shown in FIG. 6, process 600 may include determining whether the management service or the user service can be implemented in a designated computing resource(s) of the cloud computing environment (block 620). For example, management device 240 may determine whether the management service can be implemented in one or more computing resources 230 of the designated management computing resources 520 (FIG. 5A). In some implementations, management device 240 may determine whether the management service can be implemented in the designated management computing resources 520 based on available capacities associated with the designated management computing resources 520. For example, if the designated management computing resources 520 all have available capacities below a particular threshold (e.g., 10%, 20%, etc.), management device 240 may determine that the management service cannot be implemented in the designated management computing resources 520. If at least one of the designated management computing resources 520 has an available capacity above another particular threshold (e.g., 60%, 70%, etc.), management device 240 may determine that the management service can be implemented in the designated management computing resources 520.

In some implementations, management device 240 may determine whether the user service can be implemented in one or more computing resources 230 of the designated user computing resources 530 (FIG. 5B). In some implementations, management device 240 may determine whether the user service can be implemented in the designated user computing resources 530 based on available capacities associated with the designated user computing resources 530. For example, if none of the designated user computing resources 530 have available capacity, management device 240 may determine that the user service cannot be implemented in the designated user computing resources 530. If at least one of the designated user computing resources 530 has an available capacity above the particular threshold (e.g., 60%, 70%, etc.), management device 240 may determine that the user service can be implemented in the designated user computing resources 530.

As further shown in FIG. 6, if the management service or the user service can be implemented in the designated computing resource(s) (block 620—YES), process 600 may include implementing the management service or the user service in the designated computing resource(s) (block 630). For example, management device 240 may determine that the management service can be implemented in the designated management computing resources 520 when the designated management computing resources 520 include enough capacity to implement the management service. In some implementations, when management device 240 makes this determination, management device 240 may implement the management service in the designated management computing resources 520. For example, management device 240 may instruct one or more of the designated management computing resources 520 to provide the management service for cloud computing environment 220.

In some implementations, management device 240 may determine that the user service can be implemented in the designated user computing resources 530 when the designated user computing resources 530 include enough capacity to implement the user service. In some implementations, when management device 240 makes this determination, management device 240 may implement the user service in the designated user computing resources 530. For example, management device 510 may instruct one or more of the designated user computing resources 530 to provide the user service for cloud computing environment 220.

In some implementations, management device 240 may determine whether the management service or the user service can be implemented in any of the designated computing resources 230 (e.g., computing resources 230 of the designated management computing resources 520, the designated user computing resources 530, and/or the designated management/user computing resources 540). Management device 240 may determine that the management service or the user service can be implemented in any of the designated computing resources 230 when the designated computing resources 230 include enough capacity to implement the management service or the user service.

As further shown in FIG. 6, if the management service or the user service cannot be implemented in the designated computing resource(s) (block 620—NO), process 600 may include selecting a computing resource(s) from a pool of unused computing resources with a QoS to handle the management service or the user service (block 640). For example, management device 240 may determine that the management service cannot be implemented in the designated management computing resources 520 when the designated management computing resources 520 do not include enough capacity to implement the management service. In some implementations, when management device 240 makes this determination, management device 240 may select one or more computing resources 230 from pool of unused computing resources 550 (FIG. 5D). For example, management device 240 may select, from pool of unused computing resources 550, computing resource(s) 230 with QoS capabilities that may handle management services. In some implementations, when all of computing resources 230 of cloud computing environment 220 include QoS capabilities to handle management services and/or user services, management device 240 may select any computing resource 230 from pool of unused computing resources 550 utilizing random selection, round robin selection, weighted round robin, etc.

In some implementations, management device 240 may determine that the user service cannot be implemented in the designated user computing resources 530 when the designated user computing resources 530 do not include enough capacity to implement the user service. In some implementations, when management device 240 makes this determination, management device 240 may select one or more computing resources 230 from pool of unused computing resources 550 to handle the user service.

As further shown in FIG. 6, process 600 may include implementing the management service or the user service in the selected computing resource(s) (block 650). For example, management device 240 may configure the management service or the user service in computing resource(s) 230 selected from pool of unused computing resources 550. In some implementations, management device 240 may instruct the selected computing resource(s) 230 to provide the management service or the user service for cloud computing environment 220.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Further, one or more blocks may be omitted in some implementations.

Figure 7A:
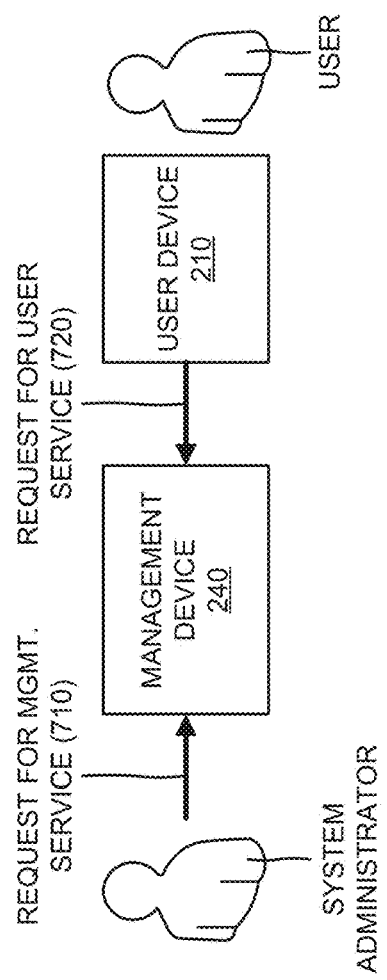

FIGS. 7A-7D are diagrams of an example 700 of the process described above with respect to FIG. 6. In example 700, assume that management device 240 receives a request 710 for a management service from a system administrator of cloud computing environment 220, as shown in FIG. 7A. Further assume that the management service includes establishing a proxy server service in cloud computing environment 220. Alternatively, or additionally, management device 240 may receive a request 720 for a user service from user device 210 associated with a user, as further shown in FIG. 7A. Assume that the user service includes providing a database application in cloud computing environment 220.

Figure 7B:
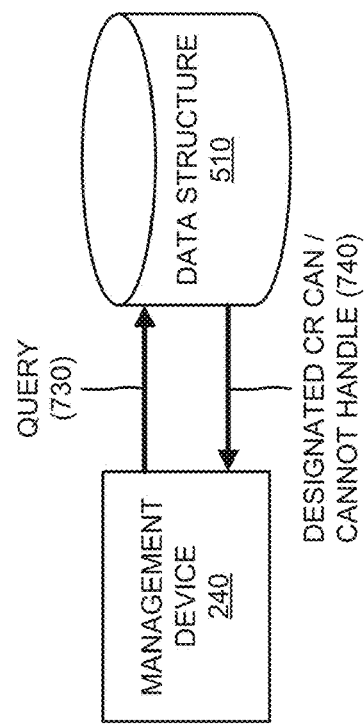

In example 700, further assume that management device 240 generates a query 730 based on request 710 for the management service (e.g., the proxy server service) or based on request 720 for the user service (e.g., the database application), as shown in FIG. 7B. Query 730 may include information for determining whether the management service or the user service may be implemented in any of the designated computing resource(s) 520/530/540. For example, query 730 may include information associated with memory requirements of the management service or the user service, bandwidth requirements of the management service or user service, process requirements of the management service or user service, etc. Management device 240 may compare query 730 to information contained in data structure 510 in order to determine whether the designated computing resource(s) 520/530/540 can handle the management service or the user service. Based on this determination, management device 240 may generate an indication 740 of whether the designated computing resource(s) 520/530/540 can or cannot handle the management service or the user service, as further shown in FIG. 7B.

For example, assume that the management service requires a high QoS and a 60% available capacity. Further assume that a first computing resource 230-1, as shown in FIG. 7C, is designated for management services, provides a high QoS, and has 80% available capacity. In such a situation, management device 240 may determine that the first computing resource 230-1 can handle the management service since the first computing resource 230-1 has a high QoS and a large available capacity. Now assume that the first computing resource 230-1 has 10% available capacity. In such a situation, management device 240 may determine that the first computing resource 230-1 cannot handle the management service since the first computing resource 230-1 has a small available capacity.

Now assume that the user service requires 50% available capacity. Further assume that the first computing resource 230-1 is designated for user services, provides a medium QoS, and has 90% available capacity. In such a situation, management device 240 may determine that the first computing resource 230-1 can handle the user service since the first computing resource 230-1 has a large available capacity. Now assume that the first computing resource 230-1 has 5% available capacity. In such a situation, management device 240 may determine that the first computing resource 230-1 cannot handle the user service since the first computing resource 230-1 has a small available capacity.

If indication 740 indicates that the designated computing resource(s) 520/530/540 can handle the management service or the user service, management device 240 may implement the management service or the user service in cloud computing environment 220, as indicated by reference number 750 in FIG. 7C. In example 700, management device 240 may instruct the first computing resource 230-1, of the designated computing resource(s) 520/530/540, to create a first virtual machine 234-1 for implementing the proxy server service or the database application. The first computing resource 230-1 may create the first virtual machine 234-1 and may provide information to the first virtual machine 234-1 so that the first virtual machine 234-1 may provide the proxy server service or the database application in cloud computing environment 220.

If indication 740 indicates that the designated computing resource(s) 520/530/540 cannot handle the management service or the user service, management device 240 may select one or more computing resources 230, from pool of unused computing resources 550, in which to implement the management service or the user service. In example 700, assume that management device 240 selects the second computing resource 230-2 from pool of unused computing resources 550, as indicated by reference number 760 in FIG. 7D. Management device 240 may implement the management service or the user service in the second computing resource 230-2, as indicated by reference number 770 in FIG. 7D. In example 700, management device 240 may instruct the second computing resource 230-2 to create the first virtual machine 234-1 for implementing the proxy server service or the database application. The second computing resource 230-2 may create the first virtual machine 234-1 and may provide information to the first virtual machine 234-1 so that the first virtual machine 234-1 may provide the proxy server service or the database application to cloud computing environment 220.

In some implementations, if the proxy server service is implemented, the proxy server service may act as an intermediary for requests from user devices 210 seeking resources from cloud computing environment 220. For example, user device 210 may connect to the proxy server service (e.g., via the first virtual machine 234-1), and may request a service, such as a file, a connection, or some other resource available from cloud computing environment 220. The proxy server service may evaluate the request as a way to simplify and control the complexity of the request.

In some implementations, if the database application is implemented, user device 210 may access the database application via the first virtual machine 234-1, and may utilize the database application. For example, user device 210 may utilize the database application to perform database management functions, to perform database calculations, to store or retrieve information, etc.

As indicated above, FIGS. 7A-7D are provided merely as an example. Other examples are possible and may differ from what was described with regard to FIGS. 7A-7D.

Systems and/or methods described herein may provide a single set or pool of computing resources (e.g., instead of two separate sets of computing resources) that may be used in a cloud computing environment as management plane resources and/or user plane resources. This may enable the cloud computing environment to add management services and/or user services via the same pool of computing resources. As a result, management services may be provided by computing resources that formerly provided user services, and user services may be provided by computing resources that formerly provided management services.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

As used herein, the term "user" is intended to be broadly interpreted to include a user device, or a user of a user device.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    designating, by a device of a cloud computing environment, a first set of one or more computing resources, of a plurality of computing resources of the cloud computing environment, for management services,
        the management services including services that manage the cloud computing environment, and
        the first set of one or more computing resources including quality of service capabilities including at least one of traffic regulation, traffic shaping, or flow throttling to achieve a first quality of service for the management services;
    provisioning, by the device, the first set of one or more computing resources with the management services;
    designating, by the device, a second set of one or more computing resources, of the plurality of computing resources, for user services,
        the second set of one or more computing resources being separate from the first set of one or more computing resources,
        the second set of one or more computing resources providing a second quality of service for the user services,
        the first quality of service being different than the second quality of service, and
        the user services including services provided to users of the cloud computing environment;
    provisioning, by the device, the second set of one or more computing resources with the user services;
    designating, by the device, a third set of one or more computing resources, of the plurality of computing resources, for a pool of unused computing resources,
        the third set of one or more computing resources being separate from the first set of one or more computing resources and the second set of one or more computing resources;
    receiving, by the device, a request for a particular management service that includes establishing a proxy server service in the cloud computing environment;
    determining, by the device, whether the first quality of service, provided by one or more of the first set of one or more computing resources, satisfies a particular quality of service of the particular management service;
    determining, by the device, whether an available capacity, associated with the one or more of the first set of one or more computing resources, satisfies a particular capacity requirement of the particular management service,
        the available capacity being a fraction of the one or more of the first set of one or more computing resources that is available for use;
    implementing, by the device, the particular management service in the one or more of the first set of one or more computing resources when the first quality of service satisfies the particular quality of service and the available capacity satisfies the particular capacity requirement;
    receiving, by the device, a request for a particular user service;
    determining, by the device, that the particular user service cannot be implemented in the second set of one or more computing resources;
    selecting, by the device, one or more computing resources from the pool of unused computing resources based on determining that the particular user service cannot be implemented in the second set of one or more computing resources; and
    implementing, by the device, the particular user service in the one or more computing resources of the pool of unused computing resources based on selecting the one or more computing resources from the pool of unused computing resources.

2. The method of claim 1, further comprising:
    designating a fourth set of one or more computing resources, of the cloud computing environment, for both the management services and the user services,
        the fourth set of one or more computing resources being separate from the first set of one or more computing resources, the second set of one or more computing resources, and the third set of one or more computing resources; and
    provisioning the fourth set of one or more computing resources with the management services and the user services.

3. The method of claim 1, further comprising:
determining information associated with the plurality of computing resources of the cloud computing environment,
the information including:
identifiers associated with the plurality of computing resources,
quality of service capabilities associated with the plurality of computing resources,
designations associated with the plurality of computing resources, and
information identifying available capacities associated with the plurality of computing resources,
the information identifying the available capacities including information identifying the available capacity; and
storing the information in a data structure associated with the device.

4. The method of claim 3, further comprising:
receiving a request for a new management service for the cloud computing environment;
determining, based on the information stored in the data structure, whether the first set of one or more computing resources can provide the new management service; and
implementing the new management service in the first set of one or more computing resources when the first set of one or more computing resources can provide the new management service.

5. The method of claim 4, further comprising:
selecting one or more other computing resources from the pool of unused computing resources when the first set of one or more computing resources cannot provide the new management service; and
implementing the new management service in the one or more other computing resources.

6. The method of claim 3, further comprising:
receiving a request for a new user service for the cloud computing environment;
determining, based on the information stored in the data structure, whether the second set of one or more computing resources can provide the new user service; and
implementing the new user service in the second set of one or more computing resources when the second set of one or more computing resources can provide the new user service.

7. The method of claim 6, further comprising:
selecting one or more other computing resources from the pool of unused computing resources when the second set of one or more computing resources cannot provide the new user service; and
implementing the new user service in the one or more other computing resources.

8. A device of a cloud computing environment, the device comprising:
one or more processors to:
designate a first set of one or more computing resources, of a plurality of computing resources of the cloud computing environment, for management services,
the management services including services that manage the cloud computing environment, and
the first set of one or more computing resources including quality of service capabilities including at least one of traffic regulation, traffic shaping, or flow throttling to achieve a first quality of service for the management services,
provision the first set of one or more computing resources with the management services,
designate a second set of one or more computing resources, of the plurality of computing resources of the cloud computing environment, for user services,
the second set of one or more computing resources being separate from the first set of one or more computing resources,
the user services including services provided to users of the cloud computing environment, and
the second set of one or more computing resources providing a second quality of service for the user services, different than the first quality of service,
provision the second set of one or more computing resources with the user services,
designate a third set of one or more computing resources, of the plurality of computing resources of the cloud computing environment, for a pool of unused computing resources,
the third set of one or more computing resources being separate from the first set of one or more computing resources and the second set of one or more computing resources,
receive a request for a particular management service that includes establishing a proxy server service in the cloud computing environment,
determine whether the first quality of service, provided by one or more of the first set of one or more computing resources, satisfies a particular quality of service of the particular management service,
determine whether an available capacity, associated with the one or more of the first set of one or more computing resources, satisfies a particular capacity requirement of the particular management service,
the available capacity being a fraction of the one or more of the first set of one or more computing resources that is available for use,
implement the particular management service in the one or more of the first set of one or more computing resources when the first quality of service satisfies the particular quality of service and the available capacity satisfies the particular capacity requirement,
receive a request for a particular user service,
determine that the particular user service cannot be implemented in the second set of one or more computing resources,
select one or more computing resources from the pool of unused computing resources based on determining that the particular user service cannot be implemented in the second set of one or more computing resources, and
implement the particular user service in the one or more computing resources of the pool of unused computing resources based on selecting the one or more computing resources from the pool of unused computing resources.

9. The device of claim 8, where the one or more processors are further to:
designate a fourth set of one or more computing resources, of the plurality of computing resources of the cloud computing environment, for both the management services and the user services,
the fourth set of one or more computing resources being separate from the first set of one or more computing resources, the second set of one or more computing resources, and the third set of one or more computing resources, and provision the fourth set of one or more computing resources with the management services and the user services.

10. The device of claim 8, where the one or more processors are further to:

remove one of the management services from a particular computing resource of the first set of one or more computing resources, and designate the particular computing resource for the pool of unused computing resources.

11. The device of claim 8, where the one or more processors are further to:

receive information associated with the plurality of computing resources of the cloud computing environment, the information including:
identifiers associated with the plurality of computing resources,
quality of service capabilities associated with the plurality of computing resources,
designations associated with the plurality of computing resources, and
information identifying available capacities associated with the plurality of computing resources,
the information identifying the available capacities including information identifying the available capacity, and store the information in a data structure associated with the device.

12. The device of claim 11, where the one or more processors are further to:

receive a request for a new management service for the cloud computing environment, determine, based on the information stored in the data structure, whether the first set of one or more computing resources can provide the new management service, and provision a computing resource, in the first set of one or more computing resources, to provide the new management service when the first set of one or more computing resources can provide the new management service.

13. The device of claim 12, where the one or more processors are further to:

select one or more other computing resources from the pool of unused computing resources when the first set of one or more computing resources cannot provide the new management service, and provision the one or more other computing resources to provide the new management service.

14. The device of claim 8, where the one or more processors are further to:

receive a request for a new management service for the cloud computing environment, select one or more other computing resources from the pool of unused computing resources, and provision the one or more other computing resources to provide the new management service.

15. A non-transitory computer-readable medium for storing instructions, the instructions comprising:

one or more instructions that, when executed by one or more processors of one or more devices of a cloud computing environment, cause the one or more processors to:

select a first set of one or more computing resources, of a plurality of computing resources of the cloud computing environment, for management services,
the management services including services that manage the cloud computing environment, and
the first set of one or more computing resources including quality of service capabilities including at least one of traffic regulation, traffic shaping, or flow throttling to achieve a first quality of service for the management services, provision the first set of one or more computing resources with the management services, select a second set of one or more computing resources, of the plurality of computing resources of the cloud computing environment, for user services,
the second set of one or more computing resources being separate from the first set of one or more computing resources,
the user services including services provided to users of the cloud computing environment, and
the second set of one or more computing resources providing a second quality of service for the user services, different than the first quality of service, provision the second set of one or more computing resources with the user services, designate a third set of one or more computing resources, of the plurality of computing resources of the cloud computing environment, for a pool of unused computing resources,
the third set of one or more computing resources being separate from the first set of one or more computing resources and the second set of one or more computing resources, receive a request for a particular management service that includes establishing a proxy server service in the cloud computing environment, determine whether the first quality of service, provided by one or more of the first set of one or more computing resources, satisfies a particular quality of service of the particular management service, determine whether an available capacity, associated with the one or more of the first set of one or more computing resources, satisfies a particular capacity requirement of the particular management service,
the available capacity being a fraction of the one or more of the first set of one or more computing resources that is available for use, implement the particular management service in the one or more of the first set of one or more computing resources when the first quality of service satisfies the particular quality of service and the available capacity satisfies the particular capacity requirement, receive a request for a particular user service, determine that the particular user service cannot be implemented in the second set of one or more computing resources, select one or more computing resources from the pool of unused computing resources based on determining that the particular user service cannot be implemented in the second set of one or more computing resources, and implement the particular user service in the one or more computing resources of the pool of unused computing resources based on selecting the one or more computing resources from the pool of unused computing resources.

16. The non-transitory computer-readable medium of claim 15, where the instructions further comprise:
one or more instructions that, when executed by the one or more processors, cause the one or more processors to:
receive information associated with the plurality of computing resources of the cloud computing environment,
the information including:
identifiers associated with the plurality of computing resources,
quality of service capabilities associated with the plurality of computing resources,
designations associated with the plurality of computing resources, and
information identifying available capacities associated with the plurality of computing resources,
the information identifying the available capacities
including information identifying the available capacity, and
store the information in a data structure associated with the one or more devices.

17. The non-transitory computer-readable medium of claim 16, where the instructions further comprise:
one or more instructions that, when executed by the one or more processors, cause the one or more processors to:
receive a request for a new management service for the cloud computing environment,
determine, based on the information stored in the data structure, whether the first set of one or more computing resources has capacity to provide the new management service, and
provision a computing resource, in the first set of one or more computing resources, to provide the new management service when the first set of one or more computing resources has capacity to provide the new management service.

18. The non-transitory computer-readable medium of claim 17, where the instructions further comprise:
one or more instructions that, when executed by the one or more processors, cause the one or more processors to:
select one or more other computing resources from the pool of unused computing resources when the first set of one or more computing resources does not have capacity to provide the new management service, and
provision the one or more other computing resources to provide the new management service.

19. The non-transitory computer-readable medium of claim 16, where the instructions further comprise:
one or more instructions that, when executed by the one or more processors, cause the one or more processors to:
receive a request for a new user service for the cloud computing environment,
determine, based on the information stored in the data structure, whether the second set of one or more computing resources has capacity to provide the new user service, and
provision a computing resource, in the second set of one or more computing resources, to provide the new user service when the second set of one or more computing resources has capacity to provide the new user service.

20. The non-transitory computer-readable medium of claim 19, where the instructions further comprise:
one or more instructions that, when executed by the one or more processors, cause the one or more processors to:
select one or more other computing resources from the pool of unused computing resources when the second set of one or more computing resources does not have capacity to provide the new user service, and
provision the one or more other computing resources to provide the new user service.

* * * * *